(12) United States Patent
Parks et al.

(10) Patent No.: US 7,063,019 B2
(45) Date of Patent: Jun. 20, 2006

(54) ASSEMBLIES INCLUDING EXTENDABLE, REACTIVE CHARGE-CONTAINING ACTUATOR DEVICES

(75) Inventors: Brent Parks, Englewood, CO (US); Bradley W. Smith, Ogden, UT (US); Matt Johnson, Salt Lake City, UT (US); Michael R. Schramm, Perry, UT (US)

(73) Assignee: Autoliv ASP, Inc., Ogden, UT (US)

( * ) Notice: Subject to any disclaimer, the term of this patent is extended or adjusted under 35 U.S.C. 154(b) by 159 days.

(21) Appl. No.: 10/729,702

(22) Filed: Dec. 5, 2003

(65) Prior Publication Data

US 2004/0112239 A1    Jun. 17, 2004

Related U.S. Application Data

(63) Continuation-in-part of application No. 10/193,414, filed on Jul. 11, 2002, now Pat. No. 6,907,817.

(51) Int. Cl.
 *F42B 3/12*   (2006.01)
(52) U.S. Cl. .............................. 102/202.9; 102/202.14; 102/202.7; 337/406
(58) Field of Classification Search ............ 102/202.9, 102/202.11, 202.12, 202.14, 202.8, 202.7; 337/406
See application file for complete search history.

(56) References Cited

U.S. PATENT DOCUMENTS

| | | | | |
|---|---|---|---|---|
| 731,354 | A | | 6/1903 | Fulton ............................ 92/35 |
| 1,986,273 | A | | 1/1935 | Leffingwell ................... 254/93 |
| 2,564,209 | A | * | 8/1951 | Murphy ........................ 60/632 |
| 2,768,261 | A | * | 10/1956 | Mathisen .................. 200/83 N |
| 3,049,601 | A | * | 8/1962 | Hardesty .................. 200/83 R |
| 3,106,131 | A | * | 10/1963 | Barr et al. .................... 89/1.14 |
| 3,565,398 | A | | 2/1971 | Flora et al. .................... 254/93 |
| 3,873,786 | A | * | 3/1975 | Lagofun .................. 200/61.08 |

(Continued)

FOREIGN PATENT DOCUMENTS

DE    298 17 842 U1    2/1999

(Continued)

OTHER PUBLICATIONS

ICI Aerospace: *IMT170 Bellows Actuator, Data Sheet 201*, May 1987.

(Continued)

*Primary Examiner*—Stephen M. Johnson
(74) *Attorney, Agent, or Firm*—Sally J Brown

(57) ABSTRACT

An assembly including a support housing and an actuator device. The actuator device includes an extendable initiator cup including at least one non-random fold and at least in part defining a storage chamber containing a reactive charge reactable to produce reaction products. The extendable initiator cup longitudinally extends from a first length to a second, greater length upon reaction initiation of the reactive charge. The extendable initiator cup is at least partially disposed within a longitudinally extending bore of the support housing. The support housing is effective to limit lateral expansion of the extendable initiator cup upon reaction initiation of the reactive charge. The assembly can include an electrical conductive member or an electrical switch. The extendable initiator cup can extend to sever the electrical conductive member or disengage the electrical switch, thereby interrupting the conduction of electricity through an electrical system. Alternatively, the extendable initiator cup can extend to engage the electrical switch thereby allowing the conduction of electricity through an electrical system.

40 Claims, 7 Drawing Sheets

U.S. PATENT DOCUMENTS

| | | | | |
|---|---|---|---|---|
| 3,885,223 | A | * 5/1975 | Green | 337/406 |
| 4,560,145 | A | 12/1985 | Widmer | 254/93 HP |
| 4,687,189 | A | 8/1987 | Stoll et al. | 269/22 |
| 5,201,830 | A | 4/1993 | Braswell | 244/118.5 |
| 5,221,109 | A | * 6/1993 | Marchant | 280/736 |
| 5,431,087 | A | 7/1995 | Kambara | 94/146 |
| 5,695,242 | A | 12/1997 | Brantman et al. | 297/216.1 |
| 5,871,235 | A | 2/1999 | Wier | 280/806 |
| 6,237,433 | B1 | 5/2001 | Rodrigues | 74/89.15 |
| 6,281,782 | B1 | 8/2001 | Morimoto et al. | 74/89.15 |
| 6,321,654 | B1 * | 11/2001 | Robinson | 102/251 |
| 6,454,306 | B1 * | 9/2002 | Cunningham et al. | 280/806 |
| 6,547,279 | B1 * | 4/2003 | Amamori | 280/743.1 |
| 6,556,119 | B1 * | 4/2003 | Lell | 337/157 |

FOREIGN PATENT DOCUMENTS

| | | |
|---|---|---|
| EP | 0 940 584 | 3/1998 |
| GB | 2 076 894 | 3/1980 |
| GB | 2 373 218 A | 9/2002 |

OTHER PUBLICATIONS

Abstracts of JP 11348703 Dec. 1999; JP 8058510 Mar. 1996; JP 7205750 Aug. 1995.

* cited by examiner

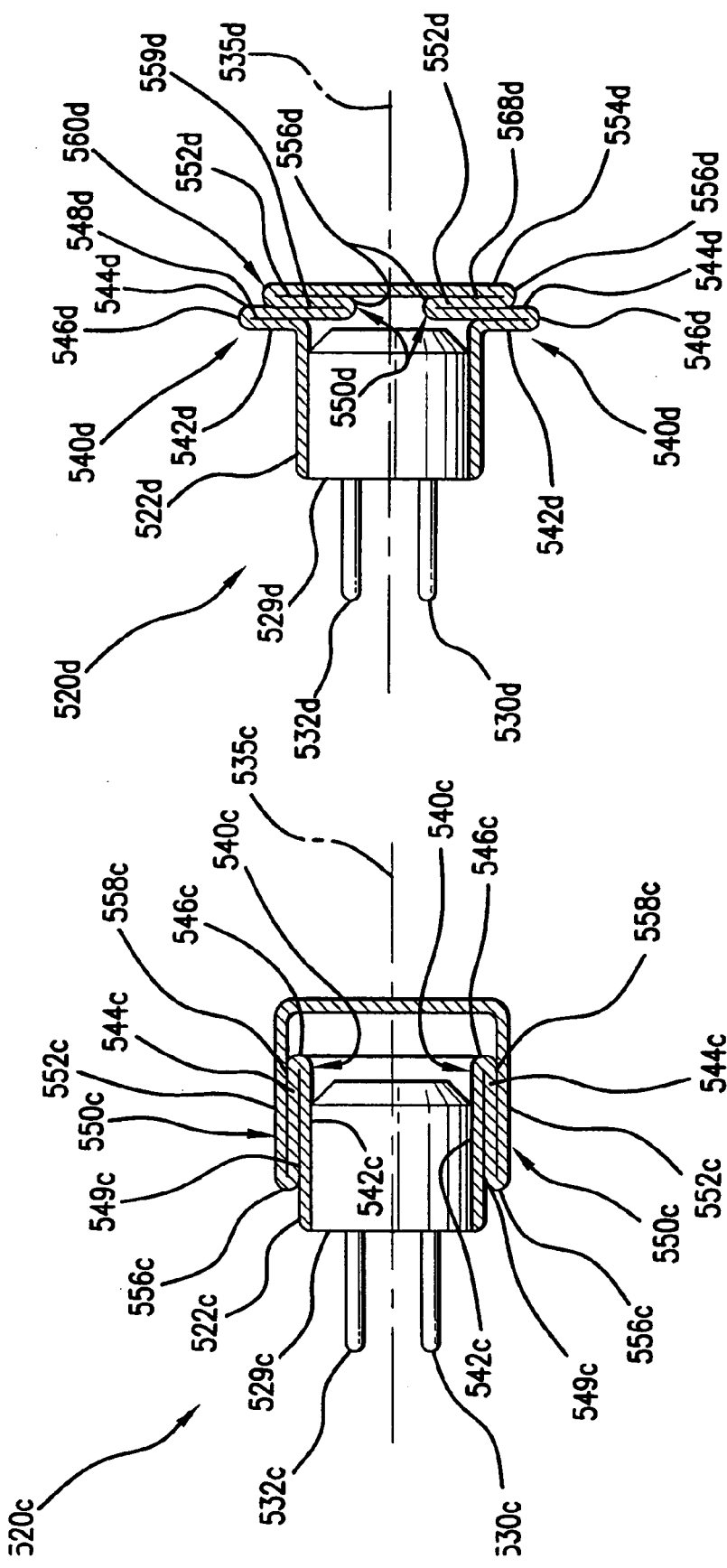

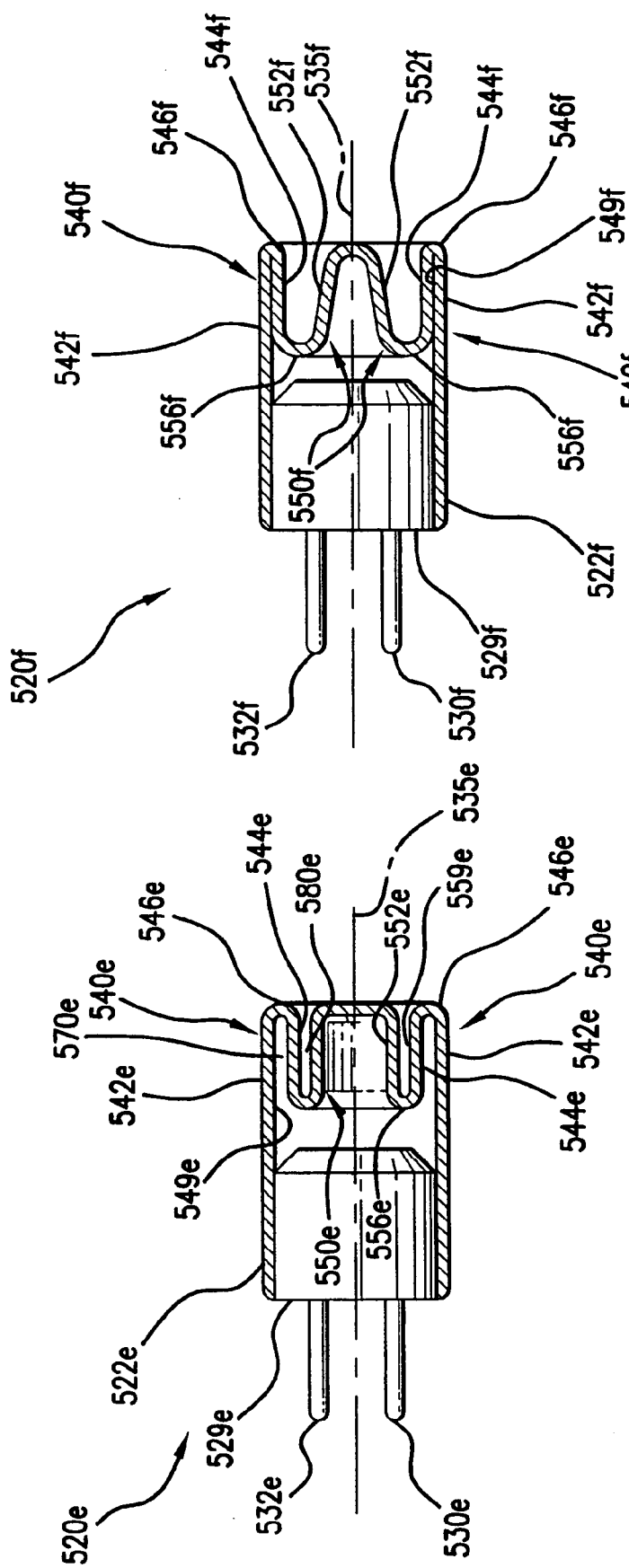

ASSEMBLIES INCLUDING EXTENDABLE, REACTIVE CHARGE-CONTAINING ACTUATOR DEVICES

CROSS REFERENCE TO RELATED APPLICATION

This application is a continuation-in-part of U.S. application Ser. No. 10/193,414, filed on 11 Jul. 2002 now U.S. Pat. No. 6,907,817. The parent application is hereby incorporated by reference herein in its entirety and is made a part hereof, including but not limited to those portions which specifically appear hereinafter.

BACKGROUND OF THE INVENTION

This invention relates generally to an assembly including an actuator device useful for electrically connecting or disconnecting electrical conductive members, such as electrical lines, circuitry and wires, and electrical switches associated with electrical conductive members. More particularly, the invention relates to an assembly including a pyrotechnic-based actuator device, such as for appropriately electrically disconnecting or connecting electrical systems, such as, for example, automotive electrical systems, upon receiving an electrical signal in response to a predetermined condition, such as, for example, a short circuit or an automobile collision.

Dimple motors have been developed as "mini-actuators." A dimple motor is a self-contained, pyrotechnic actuator having a stamped concave, or dimpled, canister. The dimple motor can be actuated by an electrical signal that activates a pyrotechnic material stored or housed within the dimpled canister. The actuated pyrotechnic material produces reaction products that cause the dimpled, concave end of the dimple canister to "pop" outward, resulting in a convex shaped dimple canister end. A dimple motor typically has a short, limited stroke, i.e., the distance the dimpled surface extends, or "pops," upon actuation, and thus dimple motors have typically had only limited application. The stroke of a dimple motor is dependant on the size of the dimpled canister containing the pyrotechnic material. A stroke to storage ratio is the ratio of stroke length to the size of the dimple canister storing the pyrotechnic material. Dimple motors typically have a low stroke to storage ratio, generally less than one.

As will be appreciated, the undesired or unintended rupture or opening of the canister or chamber containing the pyrotechnic material and/or the reaction products formed therein can result in the device failing to perform in the intended manner as well as an unintended release of the pyrotechnic material or the products formed thereby.

Actuator devices having bellow-like features have been developed to produce a motion with a generally longer stroke than available with typical dimple motors. Upon receiving an electric signal, a pyrotechnic material reacts to produce gas and/or pressure to cause a portion of the device to extend. In practice, such an actuator device must be made of a material of sufficiently high strength and thickness in order to avoid rupture upon reaction of the pyrotechnic material therein contained. As will be appreciated, such requirements can detrimentally impact either or both the cost and/or weight of such a component.

In this regards, automobile manufacturers have generally sought to minimize the weight of component parts, without sacrificing quality and safety.

Thus, there is a need for a lightweight, relatively inexpensive and efficient actuator device for appropriately electrically disconnecting or connecting automobile electrical systems, upon receiving an electrical signal in response to a predetermined condition, such as, for example, a short circuit or an automobile collision. In particular, there is a need for an actuator device assembly that allows an actuator device to be made of thinner and/or lighter weight materials and yet avoids undesired or unintended rupture. Further, there is a need for an assembly including an actuator device that, upon an electrical signal, can disengage an electrical switch, or otherwise sever an electrical conductive member. More particularly, there is also a need for an assembly including an actuator device for use in combination with automotive electrical systems, that, upon a predetermined condition such as a short circuit or a collision, will receive an electrical signal from a sensor and disengage, or electrically disconnect, an emergency power disengagement switch.

SUMMARY OF THE INVENTION

A general object of the invention is to provide an improved pyrotechnic electrical disconnect assembly having a lightweight actuator device that provides maximal work performance of the actuator device and inhibits rupturing.

A more specific objective of the invention is to overcome one or more of the problems described above.

The general object of the invention can be attained, at least in part, through an assembly comprising an actuator device. The actuator device includes an extendable initiator cup at least in part defining a storage chamber containing a charge reactable to produce reaction products. The extendable initiator cup includes at least one non-random fold. The actuator device also includes at least one electrical connector in reaction initiating communication with the reactive charge. The extendable initiator cup has a first length prior to reaction initiation of the reactive charge and, upon reaction initiation of the reactive charge, the extendable initiator cup longitudinally extends to a second length. The second length is greater than the first length. The assembly additionally includes a support housing including a longitudinally extending bore. The extendable initiator cup is at least partially disposed within the bore. The support housing is effective to limit lateral expansion of the extendable initiator cup upon reaction initiation of the reactive charge.

The prior art generally fails to disclose an assembly that provides maximal work from an actuator device by limiting lateral expansion of a longitudinally expanding actuator device. The prior art also generally fails to disclose an assembly that controls the stroke length of a longitudinally expanding actuator device, thereby providing maximal performance without rupturing the extendable initiator cup.

The invention further comprehends an assembly for interrupting conduction of electricity through an electrical conductive member. The assembly comprises an actuator device including an extendable initiator cup having at least one non-random fold and at least in part defining a storage chamber containing a reactive charge reactable to produce reaction products. The actuator device also includes at least one electrical connector in reaction initiating communication with the reactive charge. The extendable initiator cup has a first length prior to reaction initiation of the reactive charge and wherein, upon reaction initiation of the reactive charge, the extendable initiator cup longitudinally extends to a second length The second length is greater than the first length. The assembly additionally includes a support housing including a longitudinally extending bore. The extendable initiator cup is at least partially disposed within the bore. A housing end stop is connected to the support housing. The housing end stop is adjacent a first end of the bore and effective to limit longitudinal extension of the extendable initiator cup upon reaction initiation of the reactive charge. An electrical conductive member is at least partially disposed between the extendable initiator cup and the housing end stop. The extendable initiator cup is disposed in interrupting communication with the electrical conductive member, and, upon reaction initiation of the reactive charge, the extendable initiator cup extends to the second length to interrupt conduction of electricity through the electrical conductive member.

As used herein, a "fold" in the extendable initiator cup is an overlap of two portions of the extendable initiator cup. The overlapping portions of the fold may have surfaces that face each other, herein referred to as "facing surfaces," and that are in direct contact with each other, or the overlapping portion may have facing surfaces that are separated by a space or gap. A "non-random fold" refers to a fold having a definite pattern, such as a pattern designed to obtain a desired result.

As used herein, the term "longitudinal" refers to an axis of an actuator device and/or an extendable initiator cup that is parallel to the desired and intended direction of extension of the extendable initiator cup. Thus, the extendable initiator cup of the actuator device of the invention extend in a longitudinal direction.

As used herein, references to "reaction initiating communication" are to be understood to refer to a relationship between an initiating component, such as an electrical connector, and a reactable material, such as a reactive charge, wherein the initiating component is able to actuate reaction of the reactable material.

Further, references herein to "interrupting communication" are to be understood to refer to a positioning of an actuator device of the invention relative an electrical conductive member wherein the actuator device will interrupt the flow of electricity through the electrical conductive member upon actuation of the actuator device.

References to "disengaging communication" are to be understood to refer to the positioning of an actuator device of the invention relative an electrical switch wherein the actuator device, upon actuation, will directly or indirectly disengage the electrical switch, and thus interrupt the flow of electricity through the electrical switch. Oppositely, references to "engaging communication" refer the positioning of an actuator device of the invention relative an electrical switch wherein the actuator device, upon actuation, will directly or indirectly engage the electrical switch, and thus allow the flow of electricity through the electrical switch.

As used herein, two components are "electrically connected" when electricity conducting through one component is able to pass to the other component. Oppositely, two components are "electrically disconnected" if electricity conducting through one component is not able to pass to the other component.

As used herein, the term "adjacent" does not require direct contact between the adjacent objects.

Other objects and advantages will be apparent to those skilled in the art from the following detailed description taken in conjunction with the appended claims and drawings.

BRIEF DESCRIPTION OF THE DRAWINGS

FIGS. 6A–F are partial sectional views of actuator devices according to certain preferred embodiments of the invention.

DETAILED DESCRIPTION OF THE INVENTION

The present invention provides an assembly including an actuator device. As described in greater detail below, the assembly of the invention is particularly useful for activating or deactivating an electrical switch, or otherwise severing an electrical conductive member to interrupt the conduction of electricity.

The assembly of the present invention includes a support housing for an actuator device such that an extendable initiator cup of the actuator device can desirably be formed, constructed or manufactured of or from relatively thinner and/or lighter weight materials. Such support is an important factor for obtaining maximal work from the actuator device without resulting or producing an unintended or undesired rupture of the extendable cup. The assembly of the invention provides a close fit between a lateral support and the outer side surface of the extendable initiator cup and/or a rigid rear support for the actuator device that is located at an end of the actuator device opposite the direction of extension of the extendable initiator cup. In many uses of such actuator devices, if a longitudinally extendable cup of the actuator device is not radially supported, such as in an open-air, unsupported deployment, it is likely that a side wall of the extendable cup of a typical actuator device will rupture due to the pyrotechnic material load and the amount of work being performed. Lateral expansion of the longitudinally extending extendable initiator cup is generally undesired as it can reduce the energy available for the desired longitudinal extension and rupture the extendable initiator cup.

Controlling the stroke length is another important factor for obtaining maximal work from an actuator device without rupturing the extendable cup. In many uses of such actuator devices, the end of the extendable initiator cup is likely to rupture given the load of the pyrotechnic material and the amount of work being performed. Thus, as described above, materials that are stronger and/or have a greater thickness, and thus generally heavier materials, are generally needed for constructing extendable cups for unsupported, open-air firing actuator devices. In addition, the stronger materials for manufacturing and greater extendable initiator cup thicknesses are generally necessary to limit undesirable lateral expansion and provide only the desired longitudinally linear extension. Using thinner and/or lighter weight materials for an extendable initiator cup can also be advantageous in that a lesser amount of reactive charge can typically be used to extend the extendable initiator cup.

Figure 1:
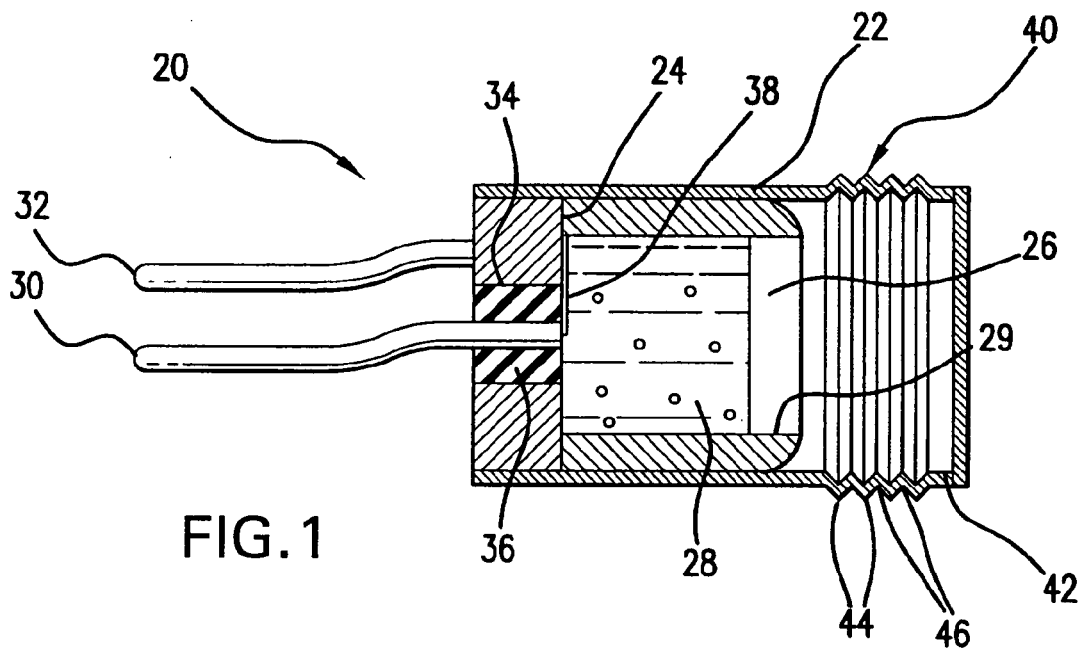
FIG. 1 is a partial sectional view of an actuator device according to one embodiment of the invention.

An actuator device according to one embodiment is shown in FIG. 1 and designated by the reference number 20. The actuator device 20 includes an extendable initiator cup 22 attached to a header body 24. The extendable initiator cup 22 and the header body 24 define a storage chamber 26 containing a reactive charge 28 reactable to produce reaction products. An optional chargeholder 29 is disposed within the storage chamber 26 and around the reactive charge 28. The chargeholder 29 focuses the reaction products from the initiated reactive charge 28 toward the end of the extendable initiator cup 22 opposite the header body 24.

Actuator devices in accordance with the invention generally include at least one electrical connector in reaction initiating communication with the reactive charge. As defined above, "reaction initiating communication" means the electrical connector(s) initiate reaction of the reactive charge upon receiving an electrical signal from an associated electrical terminal. The actuator device 20 includes a pair of electrical connectors, shown as electrical conductive pins 30 and 32, respectively, in reaction initiating communication with the reactive charge 26.

As shown in FIG. 1, the first conductive pin 30 is attached to the header body 24 with one end positioned within an eyelet 34. An insulating material 36 within the eyelet 34 can be used to separate and insulate the first conductive pin 30 from the header body 24. The second conductive pin 32, separate from the first conductive pin 30, is attached to the header body 32. As known in the art, a bridgewire 38 can be used to connect the first conductive pin 30 to the header body 24 when the insulating material 36 is present, thereby closing a circuit between the first conductive pin 30 and the second conductive pin 32. As will be appreciated, various electrical connector configurations known in the art can be used with the actuator device of this invention.

Extendable initiator cups of the invention are generally extendable from a first length to a second length upon reaction initiation of the reactive charge. The reactive charge, upon reaction initiation, produces reaction products which cause the extendable initiator cup to extend from a first length to a second length. In other words, the extendable initiator cup has a first length prior to reaction initiation of the reactive charge and, upon reaction initiation of the reactive charge, the extendable initiator cup extends to a second length, and the second length is greater than the first length.

Upon initiation, the reactive charge 28 reacts to produce reaction products that can extend the extendable initiator cup from the first length to the second length. As will be appreciated by those skilled in the art, the reactive charge 28 can include one or more known reactive charge materials, such as a pyrotechnic, which can be actuated by an electrical current introduced through conductive pins 30 and 32. The reactive charge 28 can include a fuel slurry and an oxidizer slurry mixed together and positioned in the storage chamber 26. Examples of reactive charges known in the art and useful in the actuator device of this invention include mixtures including zirconium and potassium perchlorate (ZPP). In one embodiment of this invention, the reactive charge 28 is a powder, and at least a portion of the powder reactive charge 28 is packed around the bridgewire 38 to maintain the reactive charge 28 in sufficient actuating contact with the bridgewire 38. In one embodiment of this invention, the reaction products desirably include a gas.

The extendable initiator cup 22 is desirably attached to the header body 24 to form a sealed storage chamber 26 so that the reaction products do not escape from the storage chamber 26 and extend the extendable initiator cup 22. Desirably, the reactive charge 28 is present in an amount effective upon reaction initiation to extend the extendable initiator cup 22. The extendable initiator cup 22 is desirably formed of a lightweight and/or thin material. In one embodiment of the invention, the extendable initiator cup 22 is formed of a metal, such as, for example, stainless steel. As will be appreciated, the size, shape, configuration and materials used in manufacturing of the actuator device and the extendable initiator cup can vary depending on the desired application. Likewise, the amount of reactive charge contained in the storage chamber is at least dependent on the type of reactive charge used and the size of the storage chamber, as well as the stroke, construction and materials of the extendable initiator cup.

The extendable initiator cup of this invention includes at least one non-random fold. The at least one non-random fold provides the initiator cup with extendibility. In one embodiment of this invention, as shown in FIG. 1, the extendable initiator cup 22 includes corrugations 40. The corrugations 40 include more than one non-random fold in the extendable initiator cup 22, and desirably a plurality of non-random folds, such that an outer surface of a side wall 42 of the extendable initiator cup 22 includes a plurality of alternating ridges 44 and grooves 46. The corrugations 40 allow the extendable initiator cup 22 to extend, similar to an accordion, from a first length to a second length. Upon reaction initiation of the reactive charge 28, the extendable initiator cup 22, which is shown in FIG. 1 at a first length, will extend to a second length that is greater than the first length. The pressure from the reaction products, resulting from the reaction initiated reactive charge 28, causes the corrugations 40 to widen and flatten, at least partially, thereby extending the extendable initiator cup 22 to the second length.

Figure 2A:
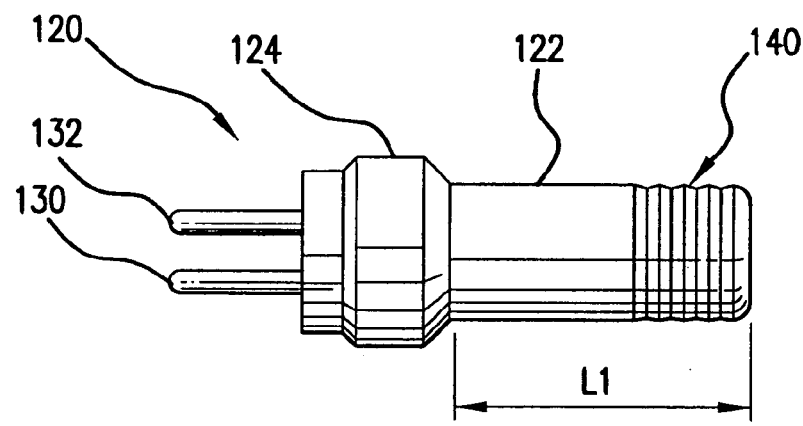
FIGS. 2A and 2B are plan views of an actuator device according to another embodiment of the invention with FIG. 2A showing the actuator device in a state prior to actuation by reaction initiation of the reactive charge and FIG. 2B showing the actuator device after actuation by reaction initiation of the reactive charge.

FIG. 2A shows an actuator device 120 according to another embodiment of this invention. The actuator device 120 includes an extendable initiator cup 122 attached to a header body 124. The extendable initiator cup 122 includes corrugations 140 and is in a non-extended state having a first length L1. Two conductive pins, designated by reference numbers 130 and 132, respectively, are connected to the header body 124 and in reaction initiating communication with a reactive charge (not shown).

Figure 2B:
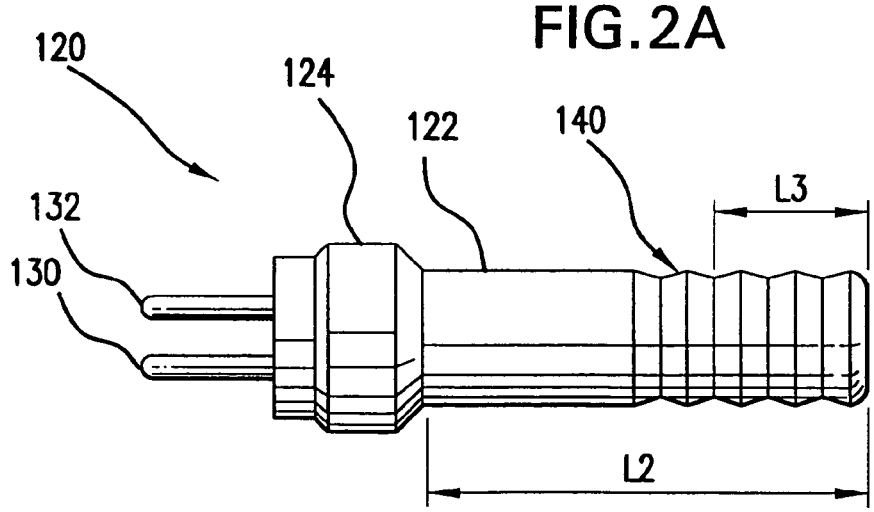

FIG. 2B shows the actuator device 120 of FIG. 2A after the reaction initiation of the reactive charge (not shown). The extendable initiator cup 122 is in a longitudinally extended state having a second length L2 which is greater than the first length L1, shown in FIG. 2A. The reaction products from the reaction of the reactive charge cause the extendable initiator cup 122 to longitudinally extend from the first length L1 to the second length L2. As shown in FIG. 2B, the increase in length of the extendable initiator cup 122 results from the extending of the corrugations 140 of the extendable initiator cup 122. In another embodiment of the invention, the entire side of the extendable initiator cup includes corrugations, and thus the entire side of the extendable initiator cup can extend.

The difference between the first length L1 and the second length L2, or the length the extendable initiator cup 122 extends, is the stroke of the actuator device 120. The stroke of the actuator device 120 shown in FIG. 2B is designated length L3. In one preferred embodiment of the invention, the stroke of the extendable initiator cup, or the difference between the first length and the second length, is desirably about 4 millimeters to about 8 millimeters. As will be appreciated, actuator devices in accordance with the invention desirably have an improved stroke to storage ratio over typical known dimple motors. More particularly, actuator devices in accordance with certain preferred embodiments of the invention advantageously have a stroke to storage ratio of greater than about 1.0 and, more desirably, greater than about 5.0. As will be appreciated the stroke and stroke to storage ratio of the actuator device of this invention can be dependant on the size, configuration and materials of the extendable initiator cup, as well as the amount and type of reactive charge.

The assembly of the present invention can include any of the actuator devices described herein and is particularly useful in combination with an electrical conductive member, such as an electrical line or wire. In one embodiment of the invention, the assembly includes a support housing that provides lateral support for an actuator device. The actuator device, upon receiving an electrical signal, can act or serve to interrupt the conduction of electricity through an electrical conductive member. In one embodiment of the invention, upon receiving an electrical signal through the electrical connector(s) to initiate reaction of the reactive charge to produce reaction products, the extendable initiator cup extends from a first length to a second length to interrupt the conduction of electricity through the electrical conductive member. The lateral support provided by the support housing of the assembly allows for use of an actuator device including a thinner and/or lighter weight extendable initiator cup.

Figure 3A:
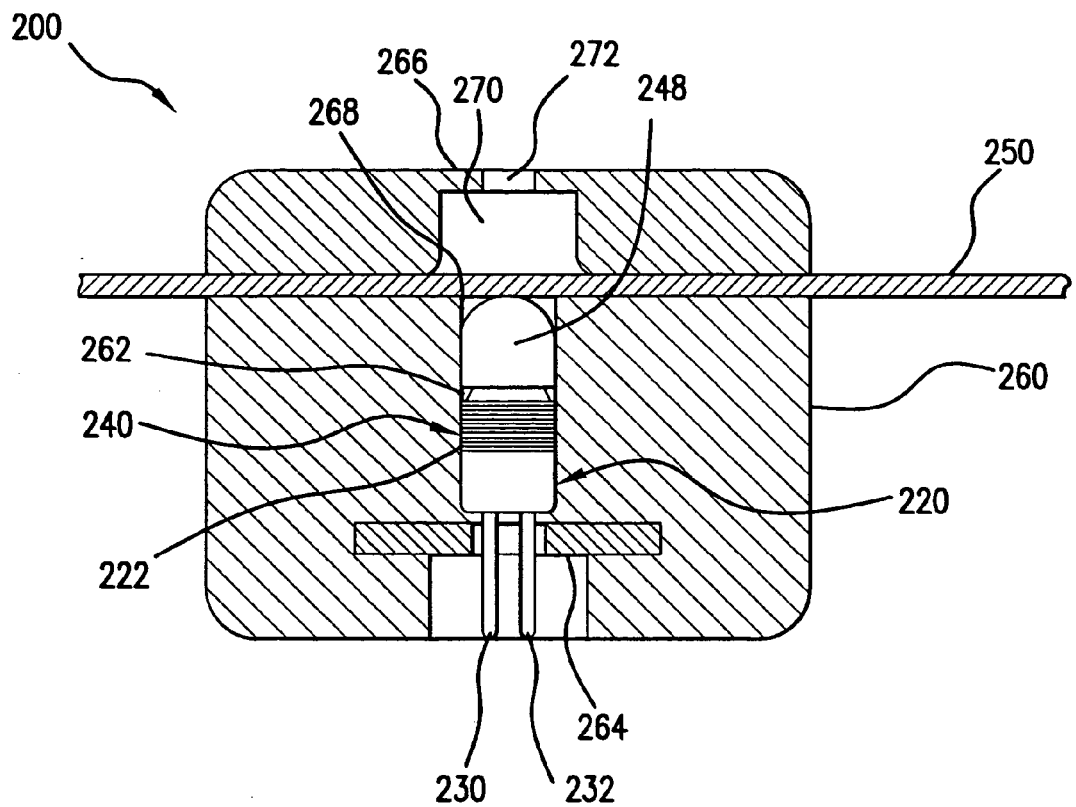
FIGS. 3A and 3B are partial sectional views of an assembly including an actuator device and an electrical conductive member, according to yet another embodiment of this invention, with FIG. 3A showing the assembly in a state prior to actuation of the actuator device by reaction initiation of the reactive charge and FIG. 3B showing the assembly after actuation of the actuator device by reaction initiation of the reactive material of the actuator device.
Figure 3B:
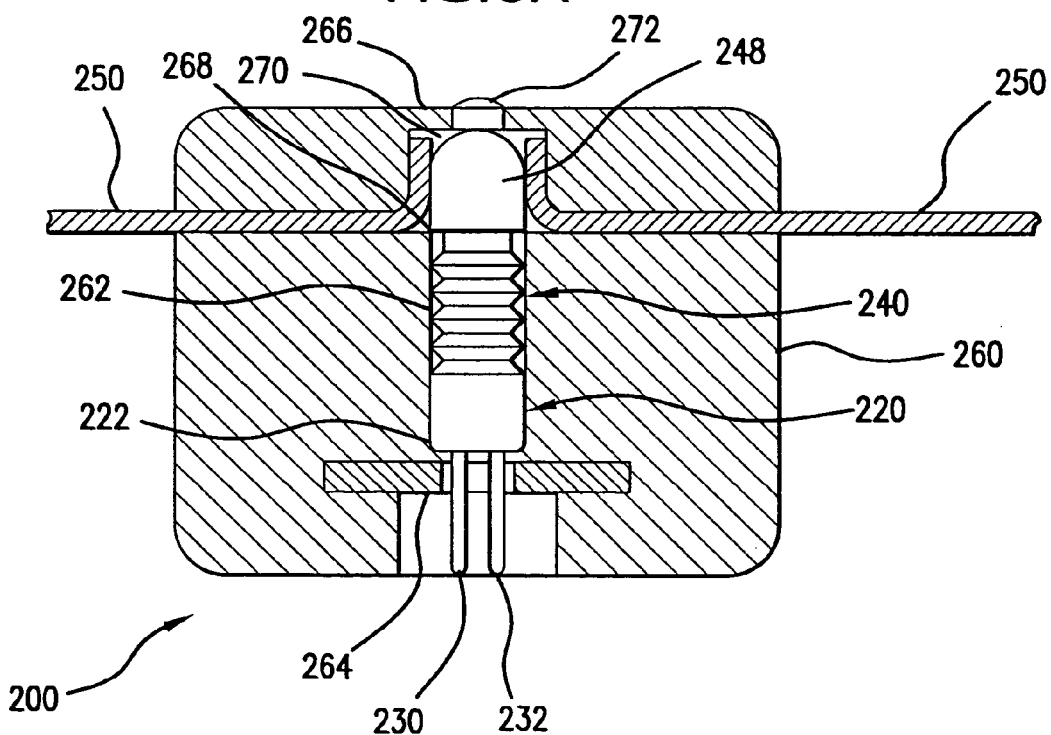

In one embodiment of the invention, the extendable initiator cup can act to interrupt the conduction of electricity through an electrical conductive member by severing the electrical conductive member. FIG. 3A shows an assembly 200, in accordance with one embodiment of the invention, including an actuator device 220, an electrical conductive member 250, and a support housing 260. The actuator device 220 includes an extendable initiator cup 222 with corrugations 240, and two electrical conductive pins 230 and 232. In particular embodiments of the invention, an optional cutting element can be used in combination with the actuator device to facilitate severing the electrical conductive member. As shown in FIG. 3A, a cutter 248 is disposed at an end of the extendable initiator cup 222 between the extendable initiator cup 222 and the electrical conductive member 250. The cutter 248 is desirably non-conductive to serve at least two purposes. First, the cutter 248 can serve to insulate the extendable initiator cup 222 so that the electrical current of the electrical conductive member does not conduct through the extendable initiator cup 222, such as when the extendable initiator cup 222 is formed of a conductive material such as a conductive metal, and actuate the reactive charge (not shown). Second, the cutter 248 can serve to separate the two resulting portions of the severed electrical conductive member 250, as shown in FIG. 3B, and does not conduct electricity from one severed electrical conductive member portion to the other severed electrical conductive member portion. Cutters according to the invention can be formed of various materials and can include various configurations. For example, in one embodiment of the invention, a cutter has a sharpened edge adjacent the electrical conductive to facilitate severing of the electrical conductive member.

The support housing 260 includes a longitudinally extending bore 262. The actuator device 220 is disposed in the longitudinally extending bore 261 such that the support housing maintains the actuator device 220 in position relative to the electrical conductive member 250. A retainer element 264 secures the actuator device 220 within the bore 262. The support housing 260 is effective to limit lateral expansion of the extendable initiator cup 222 upon reaction initiation of the reactive charge. In one embodiment of the invention, the inner diameter across the bore is sized relative to the outer diameter of the extendable initiator cup 222, such that the support housing 260 is effective to limit lateral expansion of the extendable initiator cup 222. By limiting or eliminating lateral expansion of the extendable initiator cup 222, the support housing focuses the extension of the extendable initiator cup 222 in the desired longitudinal direction, toward the electrical conductive member 250. In addition, the support housing 260 limits, and desirably eliminates rupture of the extendable initiator cup, thereby allowing the extendable initiator cup 222 to be formed of thinner and/or lighter weight materials than possible with a laterally unsupported, or open-air, actuator device. Furthermore, an extendable initiator cup formed of thinner and/or lighter weight materials can typically be extended using lesser amounts of the reactive charge.

The extendable initiator cup 222 of the actuator device 220 is disposed in interrupting communication with the electrical conductive member 250. Positioning the extendable initiator cup 222 in "interrupting communication" means the extendable initiator cup is positioned relative to the electrical conductive member 250 such that, upon reaction initiation of the reactive charge within the actuator device 220, the extendable initiator cup 222 longitudinally extends in the bore 262 from a first length to a second length and interrupts conduction of electricity through the electrical conductive member. FIG. 3B shows the assembly 200 of FIG. 3A after actuation of the actuator device 220. The extendable initiator cup 222 is extended to a second length and the cutter 248 has severed the electrical conductive member 250. The non-conductive cutter 248 separates two portions of the severed electrical conductive member 250. In addition, the non-conductive cutter 248 does not conduct electricity, i.e., bridge the gap between the two portions of the severed electrical conductive member 250.

The support housing 260 includes a housing end stop 266 adjacent a first end 268 of the bore 262. The housing end stop 266 is positioned relative to the extendable initiator cup 222 to be effective to limit longitudinal extension of the extendable initiator cup 222 upon reaction initiation of the reactive charge. The housing end stop 266 stops the extension of the extendable initiator cup 222 at a desired, predetermined distance that is less than the full, uninhibited extension of the extendable initiator cup 222. The housing end stop 266 can thus be used to control the stroke length of the extendable initiator cup 222. Controlling the stroke length is an important factor for obtaining maximal work from the extendable initiator cup 22 and the actuator device 220.

As shown in FIGS. 3A and 3B, the electrical conductive member 250 is positioned over the first end 266 of the bore 262 and a cavity 270 is formed between the electrical conductive member 250 and the end stop 266. As seen in FIG. 3B, upon reaction initiation of the actuator device 220, the extendable initiator cup 22 longitudinally extends pushing the cutter 248 through the electrical conductive member 250 and into the cavity 270 until the cutter 248 contacts the housing end stop 266. Upon contact of the cutter 248 with the housing end stop 266, any additional longitudinal extension of the extendable initiator cup 222 is halted.

In one embodiment of the invention, the support housing and the housing end stop are integrally formed as one piece. In another embodiment of the invention, the housing end stop is formed as a separate component that is connected to the support housing. As will be appreciated by one skilled in the art following the teachings herein provided, various sizes, shapes and configurations of the support housing and housing end stops are available for particular embodiments of the assembly of the invention.

The housing end stop 266 shown in FIG. 3B includes an optional visual indicator 272. The visual indicator 272 can be formed of a flexible material so that the cutter 248, upon the extension of the extendable initiator cup 222, contacts the visual indicator 272 and pushes the visual indicator 272 outward from the housing end stop 266. A visual indicator can be used to indicate whether the actuator device has fired, thereby indicating a short circuit and where repairs are needed in an electrical system.

In another embodiment of the invention, the electrical conductive member includes an electrical switch and the extendable initiator cup of the actuator device is disposed in disengaging communication with the electrical switch. The actuator device is in "disengaging communication" with the electrical switch when the extendable initiator cup is positioned relative the electrical switch such that, upon the extension of the extendable initiator cup from the first length to the second length, the extendable initiator cup disengages, or interrupts conduction of electricity through, the electrical switch.

Figure 4A:
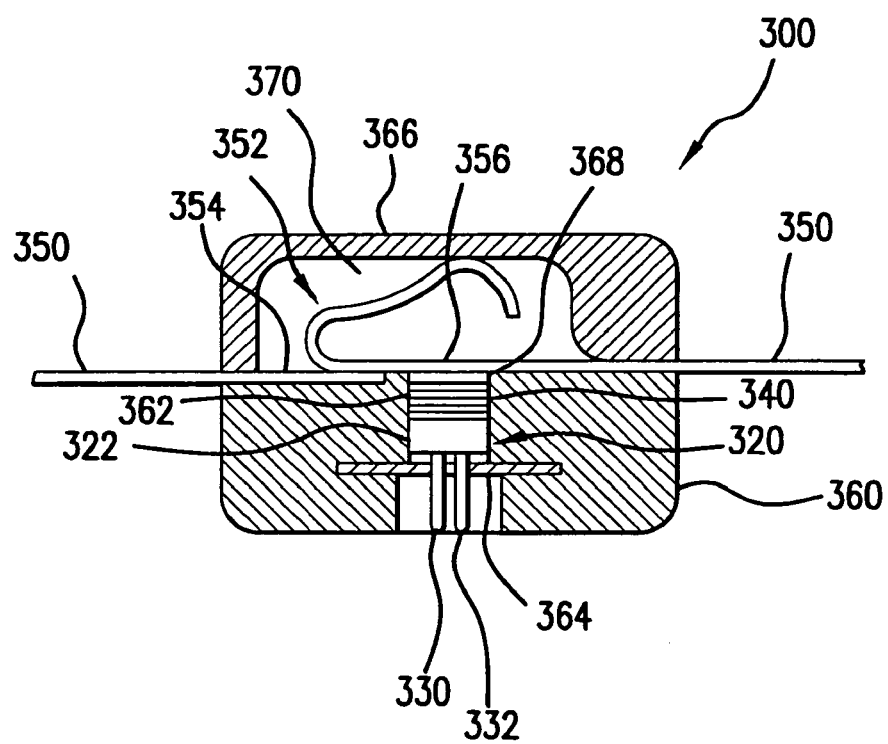
FIGS. 4A and 4B are partial sectional views of an assembly including an actuator device and an electrical switch, according to yet another embodiment of this invention, with FIG. 4A showing the assembly in a state prior to actuation of the actuator device by reaction initiation of the reactive charge and FIG. 4B showing the assembly after actuation of the actuator device by reaction initiation of the reactive material of the actuator device.

FIG. 4A shows an assembly 300 according to another embodiment of the invention. The assembly 300 includes an actuator device 320 in combination with an electrical switch 352 of an electrical conductive member 350. The actuator device 320 includes an extendable initiator cup 322 having corrugations 340, and two electrical conductive pins 330 and 332, respectively. The electrical switch 352 includes a first electrical contact 354 electrically connected to a second electrical contact 356. The first and second electrical contacts 354 and 356 are "electrically connected" when an electrical current is able to conduct from one electrical contact to the other electrical contact.

The assembly 300 also includes a support housing 360 including a longitudinally extending bore 362. The actuator device 320 is disposed in the longitudinally extending bore 361 such that the support housing maintains the actuator device 320 in position relative to the electrical switch 352. A retainer element 364 secures the actuator device 320 within the bore 362. The support housing 360 is effective to limit lateral expansion of the extendable initiator cup 322 upon reaction initiation of the reactive charge. The inner diameter across the bore 362 is sized relative to the outer diameter of the extendable initiator cup 322, and desirably sized just slightly larger than the outer diameter of the extendable initiator cup 322, such that the support housing 360 is effective to limit lateral expansion of the extendable initiator cup 322. By limiting or eliminating lateral expansion of the extendable initiator cup 322, the support housing focuses the extension of the extendable initiator cup 322 in the desired longitudinal direction, toward the electrical switch 352. In addition, the support housing 360 limits, and desirably eliminates, rupture of the extendable initiator cup 322, thereby allowing the extendable initiator cup 322 to be formed of thinner and/or lighter weight materials than possible with a laterally unsupported, or open-air, actuator device.

Figure 4B:
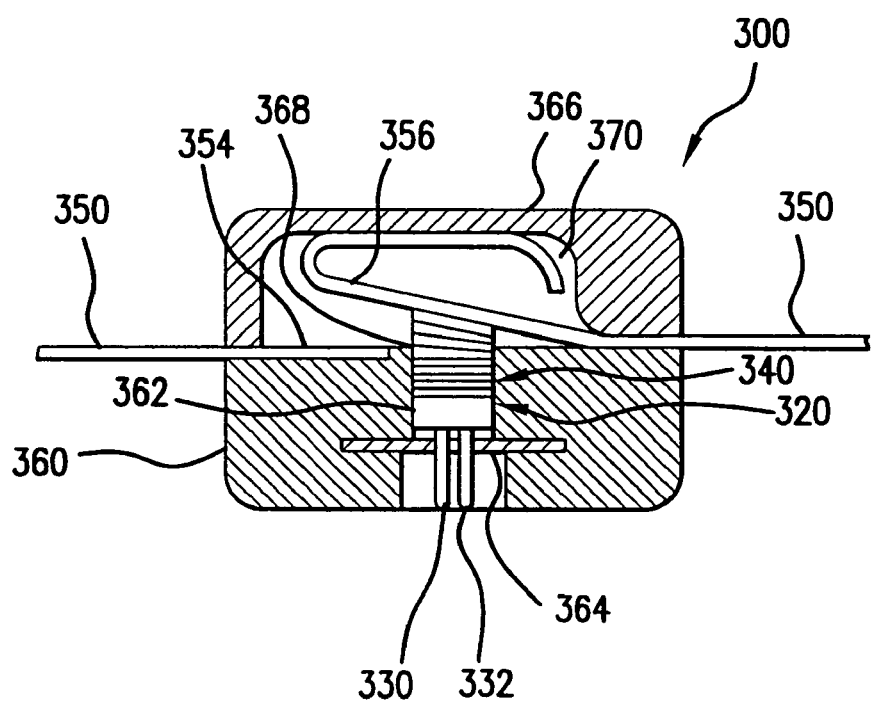

As discussed above, the extendable initiator cup 322 of the actuator device 320 is disposed in disengaging communication with the electrical switch 252. FIG. 4B shows the assembly 300 of FIG. 4A after actuation of the actuator device 320. The actuator device 320 receives an electrical signal from an electrical terminal (not shown) through the conductive pins 330 and 332, and the reactive charge within the storage chamber reacts to produce reaction products which cause the extension of the extendable initiator cup 322 from a first length, as shown in FIG. 4A, to a second length, as shown in FIG. 4B, to electrically disconnect the first electrical contact 354 and the second electrical contact 356. In the embodiment of this invention shown in FIGS. 4A and 4B, the extendable initiator cup 322 extends to electrically disconnect the second electrical contact 356 from the first electrical contact 354.

The support housing 360 includes a housing end stop 366 adjacent, and disposed over, a first end 368 of the bore 362. The housing end stop 366 is positioned relative to the extendable initiator cup 322 to allow longitudinal extension to a second length and to be effective to limit longitudinal extension to less than the full extension achievable by the extendable initiator cup 322 upon reaction initiation of the reactive charge. As shown in FIGS. 4A and 4B, the electrical switch 352 of the electrical conductive member 350 is disposed over the bore 362 in a cavity 370 formed between the bore first end 366 and the end stop 366. As seen in FIG. 4B, upon reaction initiation of the actuator device 320, the extendable initiator cup 322 longitudinally extends toward the housing end stop 366 and into the cavity 370 thereby electrically disconnecting the second electrical contact 356 from the first electrical contact 354. As shown in FIG. 4B, the extendable initiator cup 322 pushes the second electrical contact 356 into the end stop 366. The housing end stop 366 halts any additional longitudinal extension of the extendable initiator cup 322 and the extended extendable initiator cup maintains electrical disconnect between the first electrical contact 354 and the second electrical contact 356.

As discussed above, the support housing bore provides lateral support for the extendable initiator cup, and generally eliminates lateral expansion and rupture. However, as will be appreciated by one skilled in the art following the teachings herein provided, in the broader practice of the invention the extendable initiator cup, upon reaction initiation of the reactive charge, can partially extend beyond an end of the support housing bore. Such an embodiment is shown in FIG. 4B, where a portion of the extendable initiator cup 322 extends beyond the first end 368 of the bore 362. The highest pressure within the extendable initiator cup occurs just before the extendable initiator cup extends. As the extendible initiator cup extends, the volume of the storage chamber containing the reactive charge increases. As will be appreciated by one skilled in the art following the teachings herein provided, the need for lateral support provided by the support housing generally decreases as the extendable initiator cup 322 extends due to the decrease in pressure. Therefore, in particular preferred embodiments of the invention, such as shown in FIGS. 4A and 4B, the extendable initiator cup can extend beyond the end of the bore.

As will be appreciated by one skilled in the art following the teachings herein provided, the assembly in accordance with the invention is useful in many applications where an electrical conductive member would need to be severed or otherwise disconnected under a predetermined set of conditions. The actuator device of the assembly of the invention can be connected to a sensor device, such as one or more various sensors known in the art and such as used to detect various conditions. When such a sensor detects a specific condition, an electrical signal is emitted through an electrical terminal attached to the electrical connector(s), e.g., the conductive pins, of the actuator device. The actuator device is actuated and the extendable initiator cup extends to disengage an electrical switch, such as to sever the electrical conductive member or otherwise interrupt the flow of electricity through the electrical conductive member. For example, in one embodiment of the invention, the electrical switch is an emergency power disengage switch including first and second electrical contacts. The emergency power disengage switch can be incorporated into automotive applications, and upon a set of conditions, such as a short circuit or a collision, an electrical signal is received by the actuator device and the extendable initiator cup extends from a first length to a second length to electrically disconnect the first and second electrical contacts of the electrical switch, thereby avoiding a possibility of fire.

While the invention has been generally described above making reference to embodiments wherein an assembly in accordance with the invention is employed to disengage or interrupt electric communication to a particular system component, those skilled in the art and guided by the teachings herein provided will appreciate that the broader practice of the invention is not necessarily so limited. For example, and in accordance with another preferred embodiment of the invention, an assembly in accordance with the invention can, if desired, be used in combination with an electrical switch such that the extendable initiator cup of the actuator device is disposed in engaging communication with the electrical switch. For example, FIG. 5A shows an assembly 400 including an actuator device 420 in combination with an electrical switch 452 of an electrical conductive member 450.

Figures 5A, 5B:
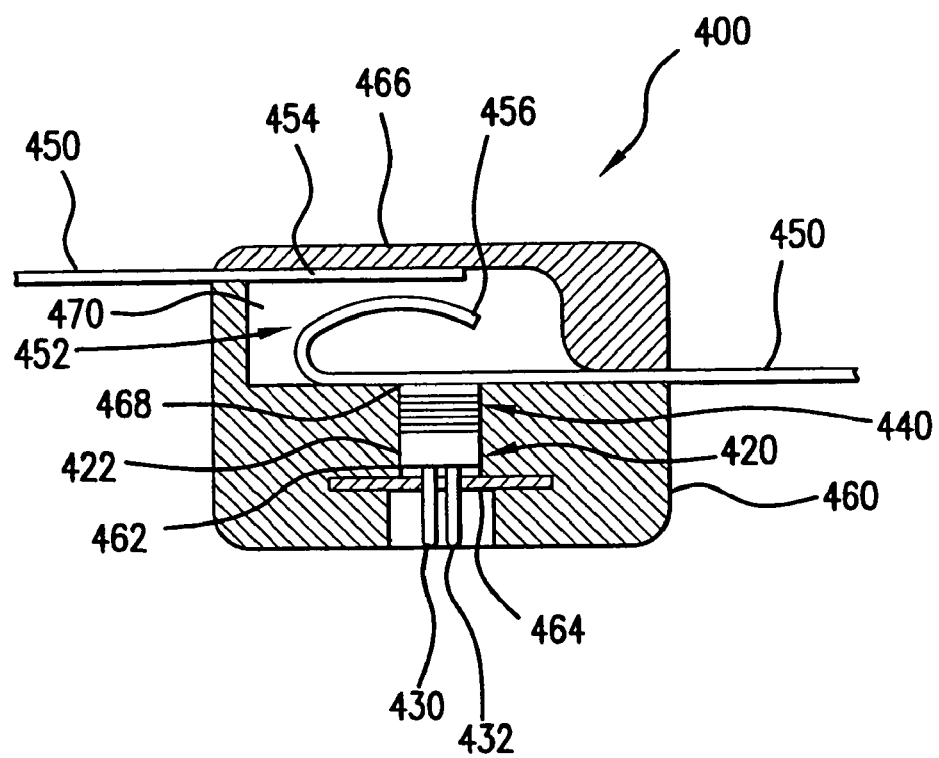
FIGS. 5A and 5B are partial sectional views of an assembly including an actuator device and an electrical switch, according to yet another embodiment of this invention, with FIG. 5A showing the assembly in a state prior to actuation of the actuator device by reaction initiation of the reactive charge and FIG. 5B showing the assembly after actuation of the actuator device by reaction initiation of the reactive material of the actuator device.

As shown in FIG. 5A, the actuator device 420 includes an extendable initiator cup 422 having corrugations 440, and two electrical conductive pins 430 and 432, respectively. The electrical switch 452 of the electrical conductive member 450 includes a first electrical contact 454 electrically disconnected from a second electrical contact 456, such that an electrical current does not pass from one electrical contact to the other electrical contact. The actuator device 420 is disposed within a longitudinally extending bore 462 of a support housing 460 and maintained in engaging communication with the electrical switch 452. A retainer element 464 secures the actuator device 420 within the bore 462. The support housing 460 includes a housing end stop 466 adjacent, and disposed over, a first end 468 of the bore 462. The housing end stop 466 is effective to limit longitudinal extension of the extendable initiator cup 422 to less than the full extension achievable by the extendable initiator cup 422 upon reaction initiation of the reactive charge. The electrical switch 452 is disposed within a cavity 470 that is between the bore first end 468 and the housing end stop 466.

The actuator device 420 receives an electrical signal from an electrical terminal (not shown) through the conductive pins 430 and 432, and the reactive charge within the storage chamber reacts to produce reaction products which cause the longitudinal extension of the extendable initiator cup 422 from a first length, as shown in FIG. 5A, to a second length, as shown in FIG. 5B, to electrically connect the first electrical contact 454 and the second electrical contact 456 and engage the electrical switch to allow electricity to flow between the first and second electrical contacts 454 and 456. In the embodiment of this invention shown in FIGS. 5A and 5B, the extendable initiator cup 422 extends to electrically connect the second electrical contact 456 to the first electrical contact 454. The first and second electrical contacts 454 and 456 are held together between the extended extendable initiator cup 422 and the housing end stop 466.

As will be appreciated by one skilled in the art following the teachings herein provided, many various configurations of non-random folds are available for use in the extendable initiator cup of the invention. FIGS. 6A–F, for example, show configurations of extendable initiator cups including at least one non-random fold in accordance with various alternative embodiments of the invention. As will also be appreciated by one skilled in the art following the teachings herein provided, additional configurations for the support housing, and the longitudinal extending bore therein, of the assembly of this invention may be required and/or desired for particular embodiments of the actuator device.

Figure 6A:
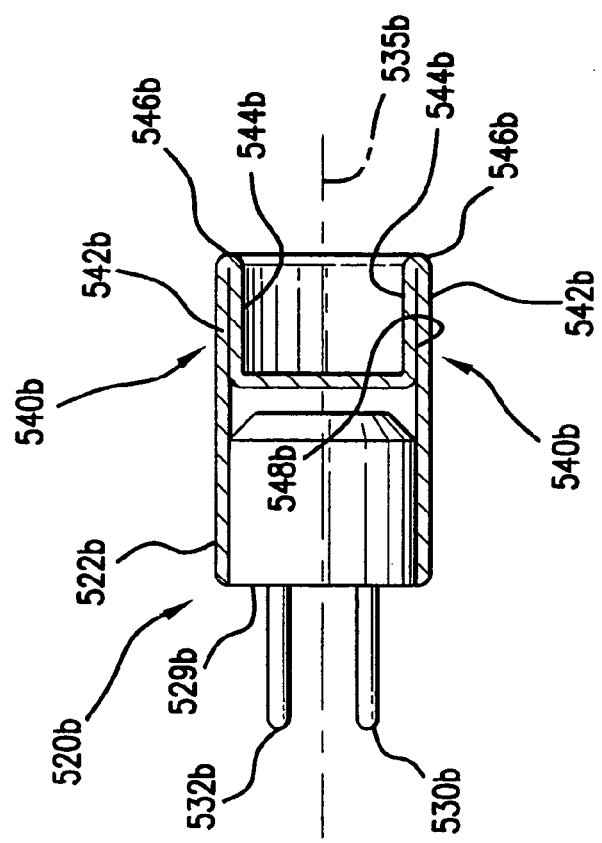

FIG. 6A shows an actuator device 520a according to one embodiment of the invention. The actuator device 520a includes two conductive pins 530a and 532a and an extendable initiator cup 522a connected to a chargeholder 529a. The actuator device 520a has a longitudinal axis 535a extending through the center of the actuator device 520a and substantially parallel with the conductive pins 530a and 532a. The extendable initiator cup 522a includes a non-random fold 540a. The fold 540a includes a first portion 542a of the extendable initiator cup 522a and a second portion 544a of the extendable initiator cup 522a. A bend 546a in the extendable initiator cup 522a forms the overlap of the first portion 542a and the second portion 544a. The bend 546a causes the second portion 544a to overlap and contact an inner surface 548a of the first portion 542a. In the fold 540a shown in FIG. 6A, both the first portion 542a and the second portion 544a of the extendable initiator cup 522a are disposed substantially perpendicular to the longitudinal axis 535a. Upon reaction initiation of a reactive charge (not shown) within the actuator device 520a, the pressure from the resulting reaction products causes the fold 540a to unfold, at least partially, thereby extending the extendable initiator cup 522a from a first length to a second length that is greater than a first length.

Figure 6B:
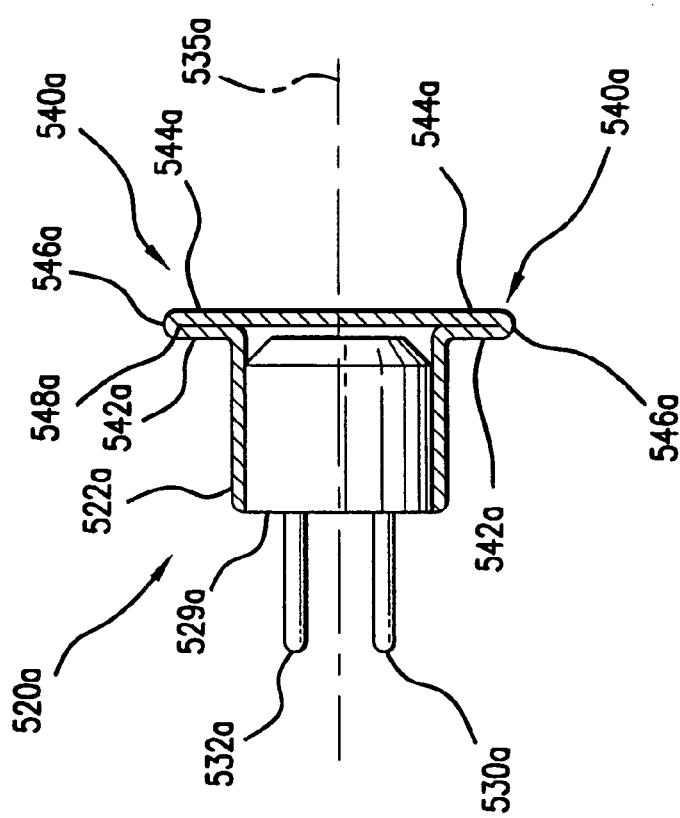

FIG. 6B shows an actuator device 520b according to another embodiment of the invention. The actuator device 520b includes two conductive pins 530b and 532b and an extendable initiator cup 522b connected to a chargeholder 529b. The actuator device 520b has a longitudinal axis 535b extending through the center of the actuator device 520b and substantially parallel with the conductive pins 530b and 532b. The extendable initiator cup 522b includes a non-random fold 540b. The fold 540b includes a first portion 542b of the extendable initiator cup 522b and a second portion 544b of the extendable initiator cup 522b. A bend 546b in the extendable initiator cup 522b forms the overlap of the first portion 542b and the second portion 544b. The bend 546b causes the second portion 544b to overlap an inner surface 548b of the first portion 542b. In the fold 540b shown in FIG. 6B, both the first portion 542b and the second portion 544b of the extendable initiator cup 522b are disposed substantially parallel to the longitudinal axis 535b. Upon reaction initiation of a reactive charge (not shown) within the actuator device 520b, the pressure from the resulting reaction products causes the fold 540b to unfold, at least partially, thereby extending the extendable initiator cup 522b from a first length to a second length that is greater than a first length.

FIG. 6C shows an actuator device 520c according to another embodiment of the invention. The actuator device 520c includes two conductive pins 530c and 532c and an extendable initiator cup 522c connected to a chargeholder 529c. The actuator device 520c has a longitudinal axis 535c extending through the center of the actuator device 520c and substantially parallel with the conductive pins 530c and 532c. The extendable initiator cup 522c includes two non-random folds. A first fold 540c includes a first portion 542c of the extendable initiator cup 522c and a second portion 544c of the extendable initiator cup 522c. A first bend 546c in the extendable initiator cup 522c forms an overlap of the first portion 542c and the second portion 544c. The first bend 546c causes the second portion 544c to overlap an outer surface 549c of the first portion 542c. In the first fold 540c shown in FIG. 6C, both the first portion 542c and the second portion 544c of the extendable initiator cup 522c are disposed substantially parallel to the longitudinal axis 535c.

The extendable initiator cup 522c also includes a non-random second fold 550c. The second fold 550c includes the second portion 544c of the extendable initiator cup 522b and a third portion 552c of the extendable initiator cup 522c. A second bend 556c in the extendable initiator cup 522c forms the overlap of the second portion 544c and the third portion 552c. The second bend 556c causes the third portion 552c to overlap an inner surface 558c of the second portion 544c. In the second fold 550c shown in FIG. 6C, both the second portion 544c and the third portion 552c of the extendable initiator cup 522c also are disposed substantially parallel to the longitudinal axis 535c. Upon reaction initiation of a reactive charge (not shown) within the actuator device 520c, the pressure from the resulting reaction products causes the first fold 540c and the second fold 550c to unfold, at least partially, thereby extending the extendable initiator cup 522c from a first length to a second length that is greater than a first length.

FIG. 6D shows an actuator device 520d according to yet another embodiment of the invention. The actuator device 520d includes two conductive pins 530d and 532d and an extendable initiator cup 522d connected to a chargeholder 529d. The actuator device 520d has a longitudinal axis 535d extending through the center of the actuator device 520d and substantially parallel with the conductive pins 530d and 532d. The extendable initiator cup 522d includes three non-random folds. A first fold 540d includes a first portion 542d of the extendable initiator cup 522d and a second portion 544d of the extendable initiator cup 522d. A first bend 546d in the extendable initiator cup 522d forms an overlap of the first portion 542d and the second portion 544d. The first bend 546d causes the second portion 544d to overlap an inner surface 548d of the first portion 542d. In the first fold 540d shown in FIG. 6D, both the first portion 542d and the second portion 544d of the extendable initiator cup 522d are disposed substantially perpendicular to the longitudinal axis 535d.

The extendable initiator cup 522d also includes a non-random second fold 550d. The second fold 550d includes the second portion 544d of the extendable initiator cup 522d and a third portion 552d of the extendable initiator cup 522d. A second bend 556d in the extendable initiator cup 522d forms the overlap of the second portion 544d and the third portion 552d. The second bend 556d causes the third portion 552d to overlap an outer surface 559d of the second portion 544d. In the second fold 550d shown in FIG. 6D, both the second portion 544d and the third portion 552d of the extendable initiator cup 522d also are disposed substantially perpendicular to the longitudinal axis 535d.

The extendable initiator cup 522d also includes a non-random third fold 560d. The third fold 560d includes the third portion 552d of the extendable initiator cup 522d and a fourth portion 554d of the extendable initiator cup 522d. A third bend 566d in the extendable initiator cup 522d causes the overlap of the third portion 552d and the fourth portion 554d. The third bend 566d causes the fourth portion 554d to overlap an inner surface 568d of the third portion 552d. In the third fold 560d shown in FIG. 6D, both the third portion 552d and the fourth portion 554d of the extendable initiator cup 522d also are disposed substantially perpendicular to the longitudinal axis 535d. Upon reaction initiation of a reactive charge (not shown) within the actuator device 520d, the pressure from the resulting reaction products causes each of the first fold 540d, the second fold 550d, and the third fold 560d to unfold, at least partially, thereby extending the extendable initiator cup 522d from a first length to a second length that is greater than a first length.

FIG. 6E shows an actuator device 520e according to yet another embodiment of the invention. The actuator device 520e includes two conductive pins 530e and 532e and an extendable initiator cup 522e connected to a chargeholder 529e. The actuator device 520e has a longitudinal axis 535e extending through the center of the actuator device 520e and substantially parallel with the conductive pins 530e and 532e. The extendable initiator cup 522e includes two non-random folds. A first fold 540e includes a first portion 542e of the extendable initiator cup 522e and a second portion 544e of the extendable initiator cup 522e. A first bend 546ein the extendable initiator cup 522e forms an overlap of the first portion 542e and the second portion 544e. The first bend 546ecauses the second portion 544e to overlap an inner surface 549e of the first portion 542e. A space 570e separates the facing surfaces of the overlapping first portion 542e and second portion 544e. In the first fold 540e shown in FIG. 6E, both the first portion 542e and the second portion 544e of the extendable initiator cup 522e are disposed substantially parallel to the longitudinal axis 535e.

The extendable initiator cup 522e also includes a non-random second fold 550e. The second fold 550e includes the second portion 544e of the extendable initiator cup 522e and a third portion 552e of the extendable initiator cup 522e. A second bend 556ein the extendable initiator cup 522e forms the overlap of the second portion 544e and the third portion 552e. The second bend 556ecauses the third portion 552e to overlap an outer surface 559e of the second portion 544e. A space 580e separates the overlapping second portion 544e and third portion 552e. In the second fold 550e shown in FIG. 6E, both the second portion 544e and the third portion 552e of the extendable initiator cup 522e also are disposed substantially parallel to the longitudinal axis 535e. Upon reaction initiation of a reactive charge (not shown) within the actuator device 520e, the pressure from the resulting reaction products causes the first fold 540e and the second fold 550e to unfold, at least partially, thereby extending the extendable initiator cup 522e from a first length to a second length that is greater than a first length.

FIG. 6F shows an actuator device 520f according to yet another embodiment of the invention. The actuator device 520f includes two conductive pins 530f and 532f and an extendable initiator cup 522f connected to a chargeholder 529f. The actuator device 520f has a longitudinal axis 535f extending through the center of the actuator device 520f and substantially parallel with the conductive pins 530f and 532f. The extendable initiator cup 522f includes two non-random folds. A first fold 540f includes a first portion 542f of the extendable initiator cup 522f and a second portion 544f of the extendable initiator cup 522f. A first bend 546f in the extendable initiator cup 522f forms an overlap of the first portion 542f and the second portion 544f. The actuator device 520f is similar in configuration to the actuator device 520e shown in FIG. 6E. However, the first bend 546f shown in FIG. 6F causes the second portion 544f to overlap and be in direct contact with an inner surface 547f of the first portion 542f. In other words, there is no space between the facing surfaces of the overlapping first portion 542f and second portion 544f. In the first fold 540f shown in FIG. 6F, both the first portion 542f and the second portion 544f of the extendable initiator cup 522f are disposed substantially parallel to the longitudinal axis 535f.

The extendable initiator cup 522f also includes a non-random second fold 550f. The second fold 550f includes the second portion 544f of the extendable initiator cup 522f and a third portion 552f of the extendable initiator cup 522f. A second bend 556f in the extendable initiator cup 522f causes the overlap of the second portion 544f and the third portion 552f. A space 580f separates the facing surfaces of the overlapping second portion 544f and third portion 552f. Upon reaction initiation of a reactive charge (not shown) within the actuator device 520f, the pressure from the resulting reaction products causes the first fold 540f and the second fold 550f to unfold, at least partially, thereby extending the extendable initiator cup 522f from a first length to a second length that is greater than a first length.

In view of the above, those skilled in the art and guided by the teachings herein provided will appreciate that the broader practice of the invention is not necessarily limited to extendable initiator cups which include or incorporate specific or particular non-random fold(s) or patterns of fold(s). Further, extendable initiator cups which include or incorporate other specific non-random fold(s) will be apparent to those skilled in the art and guided by the teachings herein provided.

Thus, the invention provides an assembly suitable for use in combination with an electrical conductive member and/or an electrical switch. The assembly provides lateral support for an actuator device and can limit longitudinal extension of an actuator device, thereby providing maximal work performance of extendable initiator cups, limiting rupturing and allowing use of lighter weight and/or thinner materials for manufacturing the extendable initiator cup and lesser amounts of reactive charge.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. An assembly comprising:
    an actuator device including:
        an extendable initiator cup at least in part defining a storage chamber containing a reactive charge reactable to produce reaction products, the extendable initiator cup including at least one non-random fold; and
        at least one electrical connector in reaction initiating communication with the reactive charge;
    the extendable initiator cup having a first length prior to reaction initiation of the reactive charge and, upon reaction initiation of the reactive charge, the extendable initiator cup longitudinally extends to a second length, where the second length is greater than the first length; and
    a support housing including a longitudinally extending bore, the extendable initiator cup at least partially disposed within the bore;
    wherein the support housing is effective to limit lateral expansion of the extendable initiator cup upon reaction initiation of the reactive charge and wherein in the absence of the support housing, the extendible initiator cup ruptures upon reaction initiation of the reactive charge.

2. The assembly of claim 1 additionally comprising a housing end stop adjacent a first end of the bore and effective to limit longitudinal extension of the extendable initiator cup upon reaction initiation of the reactive charge.

3. The assembly of claim 2 additionally comprising a cavity between the extendable initiator cup and the housing end stop, wherein, upon extending to the second length, the extendable initiator cup extends into the cavity.

4. The assembly of claim 2 additionally comprising an electrical conductive member at least partially disposed between the extendable initiator cup and the housing end stop.

5. A method for interrupting conduction of electricity through the electrical conductive member of the assembly of claim 4, the method comprising:
    initiating reaction of the reactive charge by an electrical signal through the at least one electrical connector;
    longitudinally extending the extendable initiator cup from the first length to the second length; and
    disrupting the electrical conductive member with the extended extendable initiator cup.

6. The assembly of claim 4, wherein the extendable initiator cup is disposed in interrupting communication with the electrical conductive member and, upon reaction initiation of the reactive charge, the extendable initiator cup longitudinally extends from the first length to the second length to interrupt conduction of electricity through the electrical conductive member.

7. The assembly of claim 6 wherein, upon the longitudinal extension of the extendable initiator cup from the first length to the second length, the extendable initiator cup severs the electrical conductive member.

8. The assembly of claim 7 additionally comprising a non-conductive cutter disposed relative to the extendable initiator cup wherein, upon the extension of the extendable initiator cup from the first length to the second length, the cutter severs the electrical conductive member.

9. The assembly of claim 4 wherein the electrical conductive member includes an electrical switch at least partially disposed between the extendable initiator cup and the housing end stop, the extendable initiator cup is disposed in disengaging communication with the electrical switch and, upon the longitudinal extension of the extendable initiator cup from the first length to the second length, the extendable initiator cup disengages the electrical switch.

10. The assembly of claim 9 wherein the electrical switch includes a first electrical contact electrically connected to a second electrical contact and, upon the extension of the extendable initiator cup from the first length to the second length, the extendable initiator cup electrically disconnects the first and second electrical contacts.

11. The assembly of claim 9 wherein the electrical switch is an emergency power disengage switch.

12. The assembly of claim 4 wherein the electrical conductive member includes an electrical switch at least partially disposed between the extendable initiator cup and the housing end stop, wherein the extendable initiator cup of the actuator device is disposed in engaging communication with the electrical switch and, upon the longitudinal extension of the extendable initiator cup from the first length to the second length, the extendable initiator cup engages the electrical switch.

13. The assembly of claim 12 wherein the electrical switch includes a first electrical contact electrically disconnected from a second electrical contact and, upon the longitudinal extension of the extendable initiator cup from the first length to the second length, the extendable initiator cup electrically connects the first and second electrical contacts.

14. The assembly of claim 1 wherein the extendable initiator cup includes a plurality of non-random folds.

15. The assembly of claim 14 wherein the non-random folds include corrugations.

16. The assembly of claim 1 wherein the extendable initiator cup is formed of stainless steel.

17. The assembly of claim 1 wherein the storage chamber is hermetically sealed.

18. The assembly of claim 1 wherein the reaction products include a gas.

19. The assembly of claim 1 wherein the reactive charge comprises a pyrotechnic.

20. The assembly of claim 1 wherein a difference between the first length and the second length is about 4 millimeters to about 8 millimeters.

21. The assembly of claim 1 wherein, upon extending to the second length, the extendable initiator cup partially extends beyond a first end of the bore.

22. The assembly of claim 1 wherein the actuator device has a longitudinal axis and wherein the extendable initiator cup includes a fold whereby a first portion of the extendable initiator cup and a second portion of the extendable initiator cup overlap, with both the first and the second portions of the extendable initiator cup disposed parallel the longitudinal axis of the actuator device.

23. The assembly of claim 22 wherein the extendable initiator cup has an extendable end and wherein the assembly additionally comprises a movable element disposed adjacent to the extendable end.

24. The assembly of claim 23 wherein upon longitudinal extension of the extendable initiator cup, the moveable element extends beyond the support housing bore.

25. The assembly of claim 1 wherein:
the actuator device has a longitudinal axis;
the extendable initiator cup includes a fold whereby a first portion of the extendable initiator cup and a second portion of the extendable initiator cup overlap, with both the first and the second portions of the extendable initiator cup disposed parallel the longitudinal axis of the actuator device;
the extendable initiator cup has an extendable end; and
the assembly additionally comprises a movable element disposed adjacent to the extendable end, wherein upon longitudinal extension of the extendable initiator cup, the moveable element extends beyond the support housing bore.

26. An assembly for interrupting conduction of electricity through an electrical conductive member, comprising:
an actuator device including:
an extendable initiator cup including at least one non-random fold and at least in part defining a storage chamber containing a reactive charge reactable to produce reaction products; and
at least one electrical connector in reaction initiating communication with the reactive charge;
the extendable initiator cup having a first length prior to reaction initiation of the reactive charge and wherein, upon reaction initiation of the reactive charge, the extendable initiator cup longitudinally extends to a second length, where the second length is greater than the first length;
a support housing including a longitudinally extending bore, the extendable initiator cup at least partially disposed within the bore;
a housing end stop connected to the support housing and adjacent a first end of the bore and effective to limit longitudinal extension of the extendable initiator cup upon reaction initiation of the reactive charge; and
an electrical conductive member at least partially disposed between the extendable initiator cup and the housing end stop;
wherein the extendable initiator cup is disposed in interrupting communication with the electrical conductive member, wherein, upon reaction initiation of the reactive charge, the extendable initiator cup extends to the second length to interrupt conduction of electricity through the electrical conductive member and wherein in the absence of the support housing and the end stop, the extendible initiator cup ruptures upon reaction initiation of the reactive charge.

27. The assembly of claim 26 additionally comprising a cavity between the extendable initiator cup and the housing end stop, wherein a portion of the electrical conductive member is disposed within the cavity.

28. The assembly of claim 27 wherein, upon the extension of the extendable initiator cup from the first length to the second length, the extendable initiator cup severs the electrical conductive member.

29. The assembly of claim 28 additionally comprising a non-conductive cutter disposed relative to the extendable initiator cup wherein, upon the extension of the extendable initiator cup from the first length to the second length, the cutter severs the electrical conductive member.

30. The assembly of claim 27 wherein the electrical conductive member includes an electrical switch at least partially disposed within the cavity and between the extendable initiator cup and the housing end stop, the extendable initiator cup is disposed in disengaging communication with the electrical switch and, upon the extension of the extendable initiator cup from the first length to the second length, the extendable initiator cup disengages the electrical switch.

31. The assembly of claim 30 wherein the electrical switch includes a first electrical contact electrically connected to a second electrical contact and, upon the extension of the extendable initiator cup from the first length to the second length, the extendable initiator cup electrically disconnects the first and second electrical contacts.

32. The assembly of claim 30 wherein the electrical switch is an emergency power disengage switch.

33. The assembly of claim 30 wherein, upon extending to the second length, the extendable initiator cup partially extends into the cavity.

34. The assembly of claim 26 wherein the extendable initiator cup includes a plurality of non-random folds.

35. The assembly of claim 34 wherein the non-random folds include corrugations.

36. A method for disengaging an electrical switch using the assembly of claim 26, the method comprising:
   initiating reaction of the reactive charge by an electrical signal through the at least one electrical connector;
   longitudinally extending the extendable initiator cup from the first length to the second length; and
   disengaging the electrical switch with the extended extendable initiator cup.

37. The assembly of claim 26 wherein the actuator device has a longitudinal axis and wherein the extendable initiator cup includes a fold whereby a first portion of the extendable initiator cup and a second portion of the extendable initiator cup overlap, with both the first and the second portions of the extendable initiator cup disposed parallel the longitudinal axis of the actuator device.

38. The assembly of claim 37 wherein the extendable initiator cup has an extendable end and wherein the assembly additionally comprises a movable element disposed adjacent to the extendable end.

39. The assembly of claim 38 wherein upon longitudinal extension of the extendable initiator cup, the moveable element extends beyond the support housing bore.

40. The assembly of claim 26 wherein:
   the actuator device has a longitudinal axis;
   the extendable initiator cup includes a fold whereby a first portion of the extendable initiator cup and a second portion of the extendable initiator cup overlap, with both the first and the second portions of the extendable initiator cup disposed parallel the longitudinal axis of the actuator device;
   the extendable initiator cup has an extendable end; and
   the assembly additionally comprises a movable element disposed adjacent to the extendable end, wherein upon longitudinal extension of the extendable initiator cup, the moveable element extends beyond the support housing bore.

* * * * *